United States Patent
Speer

(10) Patent No.: US 10,487,189 B2
(45) Date of Patent: Nov. 26, 2019

(54) METHOD OF MAKING A FOAM

(71) Applicant: Sealed Air Corporation (US), Elmwood Park, NJ (US)

(72) Inventor: Drew V Speer, Simpsonville, SC (US)

(73) Assignee: Sealed Air Corporation (US), Charlotte, NC (US)

( * ) Notice: Subject to any disclaimer, the term of this patent is extended or adjusted under 35 U.S.C. 154(b) by 0 days.

(21) Appl. No.: 14/891,179

(22) PCT Filed: May 15, 2014

(86) PCT No.: PCT/US2014/038176
§ 371 (c)(1),
(2) Date: Nov. 13, 2015

(87) PCT Pub. No.: WO2014/189759
PCT Pub. Date: Nov. 27, 2014

(65) Prior Publication Data
US 2016/0096942 A1 Apr. 7, 2016

Related U.S. Application Data

(60) Provisional application No. 61/826,262, filed on May 22, 2013.

(51) Int. Cl.
C08J 9/30 (2006.01)
C08J 9/12 (2006.01)
C08G 63/60 (2006.01)
C08J 9/16 (2006.01)

(52) U.S. Cl.
CPC ............... *C08J 9/30* (2013.01); *C08G 63/60* (2013.01); *C08J 9/12* (2013.01); *C08J 9/122* (2013.01); *C08J 9/16* (2013.01); *C08J 2201/026* (2013.01); *C08J 2367/04* (2013.01); *C08J 2367/06* (2013.01)

(58) Field of Classification Search
CPC ....... C08J 9/30; C08J 9/12; C08J 9/122; C08J 2201/026; C08J 2367/04; C08J 2367/06
See application file for complete search history.

(56) References Cited

U.S. PATENT DOCUMENTS

| | | | |
|---|---|---|---|
| 3,367,890 A * | 2/1968 | McManimie | C08F 283/01 521/105 |
| 4,461,850 A | 7/1984 | Carignani et al. | |
| 4,771,078 A | 9/1988 | Schisler et al. | |
| 5,661,193 A * | 8/1997 | Khemani | C08G 63/20 521/138 |
| 5,945,461 A | 8/1999 | Gosiewski et al. | |
| 6,121,398 A | 9/2000 | Wool et al. | |
| 6,586,483 B2 | 7/2003 | Kolb et al. | |
| 6,646,033 B2 | 11/2003 | Wool et al. | |
| 6,900,621 B1 | 5/2005 | Gunther | |
| 6,913,809 B2 | 7/2005 | Wolak | |
| 7,256,250 B2 | 8/2007 | Tuominen et al. | |
| 7,257,590 B2 | 8/2007 | Heiner et al. | |
| 8,912,247 B2 | 12/2014 | Wang et al. | |
| 8,912,297 B2 | 12/2014 | Flory et al. | |
| 2008/0004369 A1 * | 1/2008 | Seppala | C08F 283/00 522/165 |
| 2010/0055468 A1 | 3/2010 | Cheng et al. | |
| 2011/0159135 A1 | 6/2011 | Desmarais | |
| 2011/0159206 A1 | 6/2011 | Merrigan et al. | |
| 2012/0004334 A1 | 1/2012 | Kramer | |
| 2016/0096942 A1 | 4/2016 | Speer | |

FOREIGN PATENT DOCUMENTS

| | | | |
|---|---|---|---|
| CN | 101935405 B | * | 7/2012 |
| CN | 101935405 B | | 7/2012 |
| EP | 0307043 B1 | | 1/1992 |
| JP | S61137711 A | | 8/1986 |
| JP | 2009144021 A | | 2/2009 |

OTHER PUBLICATIONS

Enterprise Europe Network, "Lait-X technology for crosslinkable lactic acid based biopolymers and composites", www.enterprise-europe-network.ec.europa.eu/matching/completerec.cfm?BBS_ID=170143&COMPANY=398912, retrieved May 9, 2013.
Sakai, R., Baiju, J., Okamoto, M., Seppala, J.V., Vaithilingam, J., Hussein, H., and Goodridge, R., "Fabrication of polylactide-based biodegradable thermoset scaffolds for tissue engineering applications", Macromolecular Materials and Engineering, Jan. 2013, p. 45-52, vol. 298:1, Wiley-VCH, Weinheim, Germany.
Bonnaillie, L.M. and Wool, R.P., "Thermosetting foam with a high bio-based content from acrylated epoxidized soybean oil and carbon dioxide", J of Applied Polymer Science, Aug. 5, 2007, p. 1042-1052, vol. 105:3, Wiley Periodicals, Inc., US.
Bonnaillie, L.M., "Bio-based polymeric foams from soybean oil and carbon dioxide", Dissertation at University of Delaware, 2007.
Cornille, A., Dworakowsak, S., Bogdal, D., Boutevin, B., Caillol, S., "A new way of creating cellular polyurethane materials: NIPU foams", European Polymer Journal, 2015, 129-138, vol. 66, Elsevier, Amsterdam, Netherlands.
Javni, I., Hong, D.P., Petrovic, Z.S., "Soy-based polyurethanes by nonisocyanate route", Journal of Applied Polymer Science, 2008, 3867-3875, vol. 108, Wiley Periodicals, New York, US.

(Continued)

*Primary Examiner* — Kara B Boyle
(74) *Attorney, Agent, or Firm* — Jason R. Womer

(57) ABSTRACT

A method of making a foam uses the following steps. A mixture is created having a polymerizable condensation polymer and a blowing agent. The polymerizable condensation polymer has hydroxy acid units and unsaturated di-functional units. The unsaturated di-functional units are unsaturated dicarboxylic acid units or unsaturated di-alcohol units. The mixture is expanded to create a froth. The polymerizable condensation polymer in the froth is reacted to create the foam.

20 Claims, No Drawings

(56) References Cited

OTHER PUBLICATIONS

Poussard, L., Mariage, J., Grignard, B., Determbleur, C., Jerome, C., Calberg, C., Heinrichs, B., De Winter, J., Gerbaux, P., Raquez, J.M., Bonnaud, L., and Dubois, P., "Non-isocyanate polyurethanes from carbonated soybean oil using monomeric or oligomeric diamines to achieve thermosets or thermoplastics", Macromolecules, 2016, 2162-2171, vol. 49:6, ACS Publications, Washington D.C., US.

Leykin, A., Beilin, D., Birukova, O., Figovsky, O., Shapovalov, L., J., "Nonisocyanate polyurethanes based on cyclic carbonates: Chemistry and Application", 2009, p. 159-188, vol. 11:3, Israel.

"Design and Performance of radiation curable acrylates with high renewable carbon content", Presented at RadTech 2010 Technology Expo and Conference, Sartomer USA LLC, May 2010.

Blaker, J.J., Lee, K.Y., Li, X., Menner, A., Bismarck, A., "Renewable nanocomposite polymer foams synthesized from pickering emulsion templates", Green Chemistry, 2009, p. 1321-1326, vol. 11, US.

\* cited by examiner

METHOD OF MAKING A FOAM

This application claims under 35 U.S.C. § 119(e) the benefit of U.S. Provisional Application No. 61/826,262 filed May 22, 2013, which is incorporated herein in its entirety by reference.

The presently disclosed subject matter relates to foam (i.e., cellular plastic), for example, foam produced using one or more sustainably produced reactants.

SUMMARY

One or more embodiments of the disclosed subject matter are directed to methods of making a foam using the following steps. A mixture is created having a polymerizable condensation polymer and a blowing agent. The polymerizable condensation polymer has at least the following units: hydroxy acid units and unsaturated di-functional units. The unsaturated di-functional units are selected from one or more of unsaturated dicarboxylic acid units and unsaturated di-alcohol units. The polymerizable condensation polymer optionally includes a branching unit selected from (i) a polyfunctional alcohol unit derived from polyfunctional alcohol having three or more hydroxyl groups or epoxide groups and (ii) a multifunctional acid unit derived from multifunctional acids having three or more carboxyl groups. The mixture is expanded to create a froth. The polymerizable condensation polymer in the froth is reacted to create the foam.

These and other objects, advantages, and features will be more readily understood and appreciated by reference to the detailed description.

DETAILED DESCRIPTION

Various embodiments of the presently disclosed subject matter are directed to methods of making a foam and the resulting foam. A mixture is created comprising a polymerizable condensation polymer and a blowing agent. The mixture may optionally further comprise one or more of initiator, co-reactant, high-functionality reactant, and other components. The mixture is expanded to create a froth. The reactants in the froth are reacted to solidify the froth matrix and create the foam.

Polymerizable Condensation Polymer

"Polymerizable condensation polymer" as used herein refers to a condensation polymer or oligomer molecule that has sites of ethylenic unsaturation available to participate in forming covalent bonds during subsequent free radical polymerization (i.e., preferably having an average functionality of two or more) to form a larger molecular network comprising multiples of the polymerizable condensation polymer. In this sense, the free radical polymerization includes crosslinking (i.e., crosslink polymerization), such as that occurring during the free radical thermosetting reaction of the polymerizable condensation polymer, as described herein.

The polymerizable condensation polymer comprises at least two types of "units," which are the structural units of the polymer derived from the monomers or other reactants used to make the polymer. These two types of units are (1) hydroxy acid units and (2) unsaturated di-functional units. The polymerizable condensation polymer optionally comprises a third type of unit, namely, (3) branching units. The polymerizable condensation polymer may further comprise saturated di-functional units.

Hydroxy Acid Units

The hydroxy acid units are structural units derived from one or more hydroxy acids (e.g., lactic acid units are derived from lactic acid or from lactide and 6-hydroxycaproic acid units are derived from 6-hydroxycaproic acid or from ε-caprolactone). The hydroxy acid units may comprise one or more of the following: α-hydroxy acid units, β-hydroxy acid units, aliphatic α-hydroxy acid units, aromatic α-hydroxy acid units, L-lactic acid units, D-lactic acid units, glycolic acid units, 2-hydroxycaproic acid units (α-hydroxycaproic acid units), 6-hydroxycaproic acid units (i.e., caprolactone units), L-mandelic acid units, D-mandelic acid units, malic acid units, and citric acid units.

As used herein, hydroxy acid unit includes the unit whether derived from the hydroxy acid or its corresponding lactone or its corresponding cyclic di- or tri- (etc.) ester. Thus, for example, 6-hydroxycaproic acid units and caprolactone units refer to the same structural unit in the polymerizable condensation product.

The hydroxy acid units may be derived from hydroxy acid having multiple carboxyl functionality (e.g., one or more of malic acid and citric acid). The hydroxy acid units may be derived from racemic mixtures of hydroxy acids.

Unsaturated Di-Functional Units

The unsaturated di-functional units are selected from one or more of unsaturated dicarboxylic acid units (e.g., itaconic acid units) and unsaturated di-alcohol units (e.g., 1,4 butenediol). The unsaturated di-functional units, which have been copolymerized into the polymerizable condensation polymer structure during the condensation stage, provide the double-bonded carbon sites of unsaturation providing the functional sites for subsequent reaction of the polymerizable condensation polymer with the reactants, as described herein.

The unsaturated dicarboxylic acid units are structural units derived from unsaturated dicarboxylic acids and/or their corresponding anhydrides. The unsaturated dicarboxylic acid units may comprise one or more of the following: itaconic acid units, maleic acid units, tetrahydrophthalic acid, methyl-tetrahydrophthalic acid units, fumaric acid units, mesaconic acid units, and citraconic acid units.

The unsaturated di-alcohol units are structural units derived from unsaturated di-alcohols. The unsaturated di-alcohol units may comprise one or more of the following: 1,4-butenediol units, 1-propene-1,2-diol units, 2-heptene-1,7-diol units, 3-heptene-1,7-diol units, 2-hexene-1,6-diol units, 3-hexene-1,6-diol units, 1-pentene-1,5-diol units, 2-pentene-1,5-diol units, and betulin units. (Betulin is also known as betulinol.)

Branching Unit

The branching unit is selected from one or more of polyfunctional alcohol units (e.g., pentaerythritol units) and multifunctional acid units (e.g., 1,1,3-propane tricarboxylic acid units) having a functionality of three or more, as described more fully herein.

The polyfunctional alcohol units are derived from polyfunctional alcohols having three or more hydroxyl groups or epoxide groups, for example, four or more hydroxyl groups.

The polyfunctional alcohol units may comprise one or more of the following: pentaerythritol units, trimethylolpropane units, mannitol units, glycerol units, and polyglycerol units. As used herein, "polyfunctional alcohol units" include compounds having epoxide functionality for which the epoxide moiety reacts similarly as a hydroxy moiety in forming an ester linkage. Accordingly, the polyfunctional alcohol units may comprise epoxidized triglyceride units, for example, epoxidized soybean oil units.

The multifunctional acid units are derived from multifunctional acids having three or more carboxyl groups, for example, four or more carboxyl groups, and/or their corresponding anhydrides. The multifunctional acid units may comprise one or more of the following: 1,1,3-propanetricarboxylic acid units, pyromellitic dianhydride units, benzophenone tetracarboxylic dianhydride units, 1,1,2-ethanecarboxylic acid units, 1,2,3,4-butanetetracarboxylic acid units, and 1,2,3,4-cyclopentane-tetracarboxylic acid units.

The structure of the polymerizable condensation polymer, that is, for example, whether it has a star configuration, a comb configuration, or a linear configuration, depends in part on the presence and amount of branching unit in the polymerizable condensation polymer. For example, a pentaerythritol branching unit may produce a 4-arm star polymer molecule; whereas, using 1,4-butanediol units may produce a linear polymer molecule.

Saturated Di-Functional Units

The polymerizable condensation polymer may further comprise one or more saturated di-functional units selected from one or more of saturated di-carboxylic acid units (e.g., succinic acid units) and saturated di-alcohol units (e.g., 1,2-propanediol units). The saturated di-functional units, which may have been copolymerized into the polymerizable condensation polymer structure during the condensation stage, may be included, for example, to modify the viscosity or to lower the cost of the polymerizable condensation polymer.

"Saturated" as used herein with respect to the saturated di-functional units refers to the lack of ethylenically unsaturated double-bonded carbon sites that are effectively available to provide a functional site for subsequent reaction of the polymerizable condensation polymer with the reactant. As such, for example, the term "saturated dicarboxylic acid units" does not exclude aromatic cyclic or aromatic heterocyclic compounds merely because of the double-bond carbons sites in the aromatic ring.

The saturated dicarboxylic acid units are structural units derived from saturated dicarboxylic acids and/or their corresponding anhydrides. The saturated dicarboxylic acid units may comprise one or more of the following: succinic acid units, terephthalic acid units, isophthalic acid units, ortho-phthalic acid units, and adipic acid units.

The saturated di-alcohol units are structural units derived from saturated di-alcohols. The saturated di-alcohol units may comprise one or more of the following: propanediol units (e.g., 1,2-propanediol units and 1,3-propanediol units), butanediol units (e.g., 1,4-butanediol units), hexanediol units, isosorbide units, polyethylene glycol units, propylene glycol units, diethylene glycol units, ethylene glycol units, neopentyl glycol units, and 2-methyl-1,3-propanediol units.

The saturated di-carboxylic acid units and/or the saturated di-alcohol acid units may be bio-based and/or biodegradable.

Functional End Cap Units

The polymerizable condensation polymer may further be end functionalized with functional end cap units to provide additional ethylenic unsaturation and/or to concentrate the functionality at the ends of the polymer arms. Suitable functional end cap units are derived from end capping agents, which include for example methacrylic anhydride, glycidyl methacrylate, methyl methacrylate, butyl methacrylate, and the like. In the case of the alkyl acrylates, end capping is accomplished with a suitable transesterification catalyst. The end-capping of the polymerizable condensation polymer may be accomplished with functional moieties, for example as described in U.S. Patent Application Publication 2008/0004369 A1 to Seppala, which is incorporated herein in its entirety by reference.

The composition of the polymerizable condensation polymer may be as follows (mole % units based on an average amount of the units relative a representative sample of the polymerizable condensation polymer):

at least, and/or at most, any of 35, 40, 50, 60, 70, 80, and 85 mole % hydroxy acid units, or any of the more specific types of hydroxy acid units described herein;

at least, and/or at most, any of 6, 8, 10, 12, 14, 16, 18, 20, 22, and 24 mole % unsaturated di-functional units, or any of the more specific type of unsaturated di-functional units described herein;

at least, and/or at most, any of 0, 1, 2, 4, 6, 8, 10, 12, and 14 mole % branching units, or any of the more specific type of branching units described herein;

at least, and/or at most, any of 0, 2, 4, 6, 8, 10, 12, 14, 16, 18, and 20 mole % saturated di-functional units, or any of the more specific type of unsaturated di-functional units described herein; and at least, and/or at most, any of 0, 2, 4, 6, 8, 10, 12, 14, 16, 18, and 20 mole % functional end cap units, or any of the more specific type of functional end cap units described herein.

Useful polymerizable condensation polymer, and methods of making it, are described, for example, in U.S. Patent Application Publication 2008/0004369 A1 to Seppala published Jan. 3, 2008 and in U.S. Pat. No. 7,256,250 to Tuominen et al issued Aug. 14, 2007, each of which is incorporated herein in its entirety by reference.

Co-Reactant

A "co-reactant" (e.g., reactive diluent) is a reactant molecule having two or fewer sites of ethylenic unsaturation that participate in forming covalent bonds during the subsequent free radical polymerization of the polymerizable condensation polymer (i.e., have a functionality of two or one). The co-reactant may be a reactive diluent, that is, co-reactant that can act to lower the viscosity of a solution comprising the polymerizable condensation polymer (i.e., act as a solvent or diluent for the polymerizable condensation polymer). A co-reactant may be selected to improve one or more characteristics of the cured polymerizable condensation polymer, such as tensile strength, compressive strength, toughness, and/or modulus.

Useful co-reactants comprise one or more of styrene, alpha-methyl styrene, vinyl toluene, diallyl phthalate, diallyl isophthalate, diallyl maleate, and acrylate. As used herein, "acrylate" includes acrylates, methacrylates, and molecules having combinations of acrylate and methacrylate functionalities.

The co-reactant may comprise acrylate, that is, one or more of monoacrylate and diacrylate. The co-reactant may comprise monoacrylate, that is, molecules having a single acrylate functionality. Useful monoacrylates include one or more of iso-bornyl acrylate, fatty alcohol monoacrylate (e.g., lauryl acrylate), the reaction product of a fatty acid with glycidyl methacrylate, cyclohexyl monoacrylates, ethoxylated phenol monoacrylates (e.g., four-mole ethoxylated nonyl phenol acrylate), epoxy acrylates (e.g., glycidyl methacrylate), and acrylated fatty acid ester.

The co-reactant may comprise diacrylate, that is, molecules having two acrylate moieties. Useful diacrylates include, for example, one or more of polyethylene glycol diacrylates, polypropylene glycol diacrylates, butanediol diacrylate, hexandiol diacrylate, diethylene glycol diacrylate, bisphenol A diacrylates, diacrylates derived from vegetable oil, and polyester diacrylates.

Useful polyethylene glycol diacrylate include PEG 200 diacrylate, PEG 400 diacrylate, and PEG 1000 diacrylate where the numbers represent the average molecular weight of the PEG segment.

Useful polypropylene glycol diacrylates include dipropylene glycol diacrylate, and tripropylene glycol diacrylate.

Useful bisphenol A diacrylates include ethoxylated bisphenol A diacrylate, such as those having 2, 3, and 4 or more moles of ethoxylation, and including bisphenol diacrylates and bisphenol A dimethacrylates.

Useful polyester diacrylates include polyester segments comprising aliphatic and aromatic moieties. When a more rigid foam is desired, polyester segments can be chosen that have a glass transition temperature ($T_g$) that is greater than room temperature. Similarly when a more flexible foam is desired the polyester segments can be selected with a $T_g$ below room temperature. Preferred polyester acrylates may include bio-carbon content for example via the inclusion of polylactic acid) segments.

The amount of co-reactant relative the polymerizable condensation polymer in the mixture may be at least any one of 5, 6, 7, 8, 10, 12, 15, 17, 20, 30, 40, 60, 80, 100, and 120 weight parts of the co-reactant; and/or at most any one of 180, 160, 150, 130, 100, 90, 80, 70, 60, 55, 50, 40, and 30 weight parts of the co-reactant relative to 100 weight parts of the polymerizable condensation polymer.

The co-reactant may comprise an amount of acrylate (e.g., an amount of any of one or more of monoacrylate and/or diacrylate) of at least, and/or at most, any of 10, 20, 30, 40, 50, 60, 70, 80, 90, 95, and 99%, based on the weight of the co-reactant. The co-reactant may comprise monoacrylate, for example, of at least any of 1, 5, 10, 15, and 20%; and/or at most any of 40, 30, 20, 10, and 5%, based on the weight of the co-reactant. The co-reactant may comprise an amount of diacrylate, for example, of at least any of 6, 7, 8, 10, 12, 15, 17, and 20%; and/or at most any of 60, 55, 50, 40, 30, 20, and 10%, based on the weight of the co-reactant.

High-Functionality Reactant

The mixture optionally comprises a high-functionality reactant. As used herein, a "high-functionality reactant" is a reactant molecule that is not the polymerizable condensation polymer, but that has three or more sites of ethylenic unsaturation that participate in forming covalent bonds during the free radical polymerization (i.e., have a functionality of three or more) to form a larger network comprising multiples of the reactant molecules.

The high-functionality reactant may have a bio-carbon content of at least 50%, for example at least 70%, where the percent bio-carbon is defined as 100×(number of bio-derived carbon atoms/total number of carbon atoms), where the bio-derived carbon atoms are derived from biological sources.

The high-functionality reactant may comprise one or more of any of triacrylate and tetra-acrylate. Triacrylate is a molecule having three acrylate functionality sites. Tetraacrylate is a molecule having four acrylate functionality sites. Useful triacrylates and tetra-acrylates include, for example, one or more of trimethylolpropane triacrylate, ethoxylated trimethylolpropane triacrylate, pentaerythritol tetraacrylate, ethoxylated pentaerythritol tetraacrylate, polyester triacrylate, polyester tetra-acrylate, fatty acids and/or fatty acid esters having acrylate functionality, and mono-, di-, and/or triglycerides having acrylate functionality.

The high-functionality reactant may comprise triglyceride having acrylate functionality, for example, acrylated epoxidized triglyceride. Useful triglyceride having acrylate functionality may comprise triglyceride derived from plant, such as one or more of any of soybean oil, linseed oil, castor oil, cotton oil, corn oil, sunflower oil, palm oil, peanut oil, rapeseed oil, olive oil, and canola oil. Useful triglyceride having acrylate functionality may comprise triglyceride derived from animal, such as fish oil.

As is known in the art, the reactive sites (e.g., the carbon double bonds in the fatty acid chains) of a triglyceride may be epoxidized to create epoxidized sites, which may then be acrylated (i.e., reacted with an acrylic acid, methacrylic acid, acrylate, or methacrylate), for example, to create acrylated epoxidized triglyceride, for example acrylated epoxidized soybean oil (AESO) or acrylated epoxidized linseed oil (AELO). Useful triacrylates having acrylate functionality, such as AESOs, are disclosed for example in International Patent Application PCT/US2011/61915 to Speer et al, which is incorporated herein in its entirety by reference.

As used herein, "acrylate" includes acrylates, methacrylates, and molecules having combinations of acrylate and methacrylate functionalities. "Acrylate functionality" includes functionality provided by any of acrylate and methacrylate moieties. "Acrylate moieties" includes acrylate and methacrylate moieties. As used in this context, "acrylate functionality" refers to the number of acrylate moieties on the triglyceride molecule. Useful triglyceride having acrylate functionality for use as high-functionality reactant may have an acrylate functionality of any one of 3, at least 3, and 4.

The mixture may comprise the high-functionality reactant, or any one of the specific high-functionality reactants described herein, in an amount of at least any of 10, 20, 30, 40, 50, 60, 70, 100, 150, 200, 300, and 400 weight parts of the high-functionality reactant; and/or at most any of 800, 700, 600, 500, 400, 300, 200, 150, 130, 100, 80, 70, 60, 40, and 20 weight parts of the high-functionality reactant relative to 100 weight parts of the polymerizable condensation polymer.

Surfactant

The mixture may further comprise surfactant. Useful surfactants include any of one or more of polysiloxanes (i.e., silicone surfactants and ethoxylated polysiloxane), ethoxylated fatty acids, salts of fatty acids, ethoxylated fatty alcohols, salts of sulfonated fatty alcohols, fatty acid esters of sorbitan, and fatty acid ester sorbitan ethoxylates (e.g., polysorbates available from Croda under the Tween trade name).

The mixture may comprise surfactant in an amount of at least any one of 0.01, 0.05, 0.1, 0.2, 0.3, and 0.4 weight parts surfactant, and/or at most any of 3, 1, 0.7, and 0.4 weight parts surfactant, relative 100 weight parts of the polymerizable condensation polymer.

Blowing Agent

The mixture comprises blowing agent, such as physical blowing agent. A "physical blowing agent" is a blowing agent that does not require a chemical reaction to generate the foaming gas or vapor, the latter being characterized as a "chemical blowing agent." Useful physical blowing agents include one or more of inorganic blowing agents and organic blowing agents. Preferred blowing agents will have a sufficient solubility in the reactants to produce a low density foam. The solubility of gaseous blowing agents will typically increase with the pressure applied.

Useful inorganic blowing agents include one or more of carbon dioxide, nitrogen, argon, water, air, sulfur hexafluoride ($SF(6)$), and helium. For example, the mixture may comprises carbon dioxide dissolved in the polymerizable condensation polymer. The solubility of carbon dioxide will typically increase with increasing pressure.

Useful organic blowing agents include one or more of aliphatic hydrocarbons having 1-9 carbon atoms, aliphatic alcohols having 1-3 carbon atoms, fully and partially halogenated aliphatic hydrocarbons (e.g., those having 1-4 carbon atoms), hydrofluorocarbons (HFCs), chlorofluorocarbons, hydrochlorofluorocarbons, esters such as methyl formate, methyl acetate, ethers such as dimethyl ether, diethyl ether, and ketones, such as acetone.

Aliphatic hydrocarbons include methane, ethane, propane, n-butane, isobutane, n-pentane, isopentane, neopentane, cyclopentane and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbon blowing agents include methyl fluoride, perfluoromethane, ethyl fluoride, 1,1-difluoroethane (HFC-152a), fluoroethane (HFC-161), 1,1,1-trifluoroethane (HFC-143a), 1,1,1,2-tetrafluoroethane (HFC-134a), 1,1,2,2-tetrafluoroethane (HFC-134), 1,1,1,3,3-pentafluoropropane, pentafluoroethane (HFC-125), difluoromethane (HFC-32), perfluoroethane, 2,2-difluoropropane, 1,1,1-trifluoropropane, 1,1,1,3,3-pentaflurorpropane (HFC-245a), perfluoropropane, dichloropropane, difluoropropane, perfluorobutane, and perfluorocyclobutane. Partially halogenated chlorocarbon and chlorofluorocarbon blowing agents include methyl chloride, methylene chloride, ethyl chloride, 1,1,1-trichloroethane, 1,1-dichloro-1 fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,2-dichlorotetrafluoroethane (CFC-114), chloroheptafluoropropane, and dichlorohexafluoropropane.

The blowing agent of the mixture may comprise one or more of the foregoing blowing agents used alone or in combination. For example, the blowing agent may comprise a blend of from 35 to 65 weight % isobutane and from 35 to 65 weight % n-butane.

An amount of blowing agent is incorporated into the mixture sufficient to make a foam. For example, the amount of blowing agent added to the mixture may be at least any of the following: 0.05, 0.2, and 0.5 moles blowing agent per kilogram of the first reactant; and/or at most any of the following: 5, 3, and 2.5 moles blowing agent per kilogram of the first reactant. Also by way of example, the amount of blowing agent added to the mixture may be at least any of 0.5 parts, 1 part, 3 weight parts, and/or at most any of 80 parts, 30 parts, and 15 weight parts, based on 100 parts by weight of the first reactant.

The mixture may comprise water in an amount of at least, and/or at most, any of 0.4, 1, 2, 5, 8, 10, 15, and 20 weight parts water relative 100 weight parts of the first reactant.

Initiator

The mixture may comprise initiator. Useful initiators include thermally-activated initiators and radiation-activated initiators.

The initiator is an agent used as a source of free radicals to start the polymerization reaction (e.g., crosslink polymerization) of the polymerizable condensation polymer and/or other components in the mixture. A thermally-activated initiator is one that thermally decomposes to produce the radicals that initiate the polymerization reaction. The half life of an initiator is characterized as the time required to reduce the original initiator concentration of a solution by 50%, at a given temperature. As used herein, the "initiation temperature" of a thermally-activated initiator is the temperature corresponding to a ten-hour half life of the initiator using benzene solvent (0.2M concentration) or equivalent. For example, the initiation temperature of dilauroyl peroxide (i.e., without promoter) is 62° C. A thermally-activated initiator is "activated" upon reaching the initiation temperature.

Useful thermally-activated initiators include one or more of azo compounds, organic peroxides, such as any of diacyl peroxide, dilauroyl peroxide, benzoyl peroxide, tert-butyl benzoyl peroxide, dicumyl peroxide, dialkyl peroxide, peroxyesters, peroxydicarbonates, hydroperoxides, peroxymonocarbonates, peroxyketals, 2,4-pentanedione peroxide, and methyl ethyl ketone peroxide. Useful peroxides and their corresponding ten-hour half life temperatures are disclosed, for example, in U.S. Pat. No. 4,143,099 to Duncan and U.S. Pat. No. 4,607,087 to Moriya et al, each of which is incorporated herein in its entirety by reference.

The thermally-activated initiator may comprise more than one type of thermally-activated initiator, for example, a first thermally-activated initiator and a second thermally-activated initiator, where the initiation temperature of the first initiator is lower than the second initiator, for example, lower by any of the following: 10° C., 20° C., and 30° C.

The amount of thermally-activated initiator may be at least, and/or at most, any one of 0.1, 0.5, 1, 1.5, 2, 3, 4, and 5 weight parts thermally-activated initiator relative 100 weight parts of the polymerizable condensation polymer.

Useful radiation-activated initiator includes one or more of visible or ultraviolet light-activated initiators, such as one or more of benzophenone, and its derivatives, such as methoxybenzophenone, dimethoxybenzophenone, dimethylbenzophenone, diphenoxybenzophenone, allyloxybenzophenone, diallyloxybenzophenone, dodecyloxybenzophenone, dibenzosuberone, 4,4'-bis(4-isopropylphenoxy) benzophenone, 4-morpholinobenzophenone, 4-aminobenzo-phenone, tribenzoyl triphenylbenzene, trituoyl triphenylbenzene, 4,4'-bis(dimethyl-amino)benzophenone, acetophenone and its derivatives, such as, o-methoxy-acetophenone, 4'-methoxyacetophenone, valerophenone, hexanophenone, α-phenyl-butyrophenone, p-morpholinopropiophenone, benzoin and its derivatives, such as, benzoin methyl ether, benzoin butyl ether, benzoin tetrahydropyranyl ether, 4-o-morpholinodeoxybenzoin, substituted and unsubstituted anthraquinones, α-tetralone, acenaphthenequinone, 9-acetylphenanthrene, 2-acetyl-phenanthrene, 10-thioxanthenone, 3-acetyl-phenanthrene, 3-acetyl-indole, 9-fluorenone, 1-indanone, 1,3,5-triacetylbenzene, thioxanthen-9-one, isopropylthioxanthen-9-one, xanthene-9-one, 7-H-benz[de]anthracen-7-one, 1'-acetonaphthone, 2'-acetonaphthone, aceto-naphthone, benz[a]anthracene-7, 12-dione, 2,2-dimethoxy-2-phenylacetophenone, α,α-diethoxyacetophenone, α,α-dibutoxyacetophenone, 4-benzoyl-4'-methyl(diphenyl sulfide), bis acylphosphine oxides and the like. Single oxygen-generating photosensitizers such as Rose Bengal, methylene blue, and tetraphen-ylporphine as well as polymeric initiators such as polyethylene carbon monoxide) and oligo[2-hydroxy-2-methyl-1-[4-(1-methyl-vinyl)phenyl]propanone] also can be used.

A radiation-activated initiator is "activated" upon exposure to actinic radiation, that is, a sufficient amount and type of radiation under conditions to cause the initiator to decompose to produce the radicals that initiate the polymerization reaction.

The amount of radiation-activated initiator may be at least, and/or at most, any one of 0.1, 0.5, 1, 1.5, 2, 3, 4, 5, and 10 weight parts radiation-activated initiator relative 100 weight parts of the polymerizable condensation polymer.

Promoters

One or more promoters (also known as accelerators) may optionally be used in combination with the initiator to increase the activity of the initiator. Useful promoters include transition metal salts such as cobalt salts, copper salts, iron salts, vanadium salts and tertiary amines, such as aromatic tertiary amines such as N,N'-dimethylaniline, N,N'dimethyl-p-toluidine, N-(2-hydroxylethyl)-N-methyl-p-toluidine. As used herein, the "promoted temperature" of a thermally-activated initiator is the temperature corresponding to a ten-hour half life of the initiator using benzene solvent (0.2M concentration) or equivalent, in the presence of the promoter in the same weight ratio (weight parts promoter to million weight parts initiator) that is used in the method. If no promoter is used in the method, then the "promoted temperature" is the same temperature as the "initiation temperature."

One or more co-promoters may optionally be used. As used herein a co-promoter is a compound that increases the activity of a given promoter.

Useful amounts of promoter range from at least any of 100, 200, and 300 weight parts promoter per million weight parts initiator; and/or at most any of 2,000; 1,000; 800; and 500 weight parts promoter per million weight parts initiator. Useful co-promoters include ethyl acetoacetate, methyl acetoacetate, N,N'-dimethylacetamide, and acetoacetanilide. Co-promoters are typically used in conjunction with transition metal salts.

Additives

The mixture may comprise one or more additives, such as one or more of nucleating and/or reinforcing agent (e.g., cellulosic material such as cellulose fiber, wood pulp, powdered paper, natural clays and modified intercalated clays, and nanoparticles), flame retardant (e.g., ATH), aging modifier (e.g., fatty acid ester, fatty acid amide, hydroxyl amide), pigment, colorant, antioxidant, stabilizer, wax, fragrance, and odor masking agent. The nucleating agent may assist in controlling the size of foam cells. The stabilizer may enhance dimensional stability of the foam. Exemplary stabilizers include amides and esters of C(10-24) fatty acids, stearyl stearamide, glyceromonostearate, glycerol monobehenate, and sorbitol monostearate.

Manufacture of the Foam

The components of the mixture are mixed together to create a mixture comprising the polymerizable condensation polymer, the co-reactant, the high-functionality reactant (if used), the blowing agent, and the other components, for example by stirring in a mixing vessel or extruding in an extrusion mixer. Methods and devices for mixing components are known to those of skill in the art. The resulting mixture may be free of isocyanate reactants, such as those used in formulating polyurethane foams, so that the final foam of the present disclosure may be free from isocyanates or isocyanate residues.

The physical blowing agent may be added to the mixer and mixed at an elevated pressure, for example, a pressure at least any one of 200, 300, 350, 500, and 800 psig. The components and blowing agent are preferably mixed sufficiently to distribute and disperse the components.

The mixture is expanded to create a froth. A "froth" is the expanded mixture comprising reactants and other components before the reaction (polymerization or cure) of the reactants to form a foam having a solidified resin matrix surrounding the cellular structure. The mixture may be expanded to the froth by expanding from, for example, any one of the pressures listed in the previous paragraph, to, for example, ambient atmospheric pressure. The sudden reduction in pressure causes the blowing agent within the mixture to vaporize or expand into a plurality of cells within the mixture. As a result, the froth has "bubbles" or cells of the blowing agent gas suspended within the pre-reacted mixture.

The reactants (e.g., the polymerizable condensation polymer, the co-reactant, the high-functionality reactant) of the froth are reacted to create a solidified matrix surrounding and entrapping blowing agent gas bubbles and creating the foam. Where initiator is used, the initiator is activated to initiate the reaction of the reactants as is known to those of skill in the field of polymer chemistry. Where a thermally-activated initiator is used, the froth is provided at a temperature sufficient to activate the initiator and facilitate the reaction of the reactants. Where the thermally-activated initiator comprises a first thermally-activated initiator that activates at a first temperature greater than the activation temperature of a second thermally-activated initiator, then the temperature of the reactants within the froth may be elevated in a controlled fashion to help control the rate of the curing reaction, as well as potentially extend the curing reaction time. In some instances where a thermally-activated initiator is used, it may be brought together with a sufficient quantity of promoter and/or co-promoter just before or during the formation of the froth such that cure begins at ambient temperatures.

Where a radiation-activated initiator is used, the froth is exposed to an amount and type of actinic radiation sufficient to activate the radiation-activated initiator. For example, if a visible or ultraviolet (UV) light activated initiator is used, then the froth may be exposed to visible or UV light accordingly using, for example, visible or UV lamps known to those of skill in the field.

If initiator is not used to facilitate the reaction of the reactants, then the froth may be exposed to actinic radiation such as electron beam or gamma radiation sufficient to initiate the reaction of the reactants to form the cured matrix. The dose and energy level for initiation of such reaction is readily determinable by those of skill in the field.

The foam may be manufactured, for example, using any of the methods disclosed in U.S. Patent Application Ser. No. 61/728,932 filed Nov. 21, 2012 by Mahon et al, which is incorporated herein in its entirety by reference. The Mahon reference describes carbon dioxide as the blowing agent for use in conjunction with the disclosed polymerizable resin and its foaming process; however, any one or more of the blowing agents described herein may be substituted for the carbon dioxide blowing agent described in the incorporated Mahon reference; and any one or more of the polymerizable condensation polymers described herein may be substituted for the polymerizable resin disclosed in the incorporated Mahon reference.

Foam

The resulting foam (i.e., cellular plastic) may have a density of at most, and/or at least, any one of 0.25, 0.5, 1.0, 1.5, 2.0, 2.5, 3.0, 4.0, 6.0, 7.0, 10.0, 20.0 and 30.0 pounds per cubic foot (pcf). For protective packaging (e.g., cushioning) applications, lower densities are preferred. Unless otherwise noted, the density of the foam as used herein is the apparent density measured according to ASTM D1622-08, which is incorporated herein in its entirety by reference.

The resulting foam may have a compressive strength at 50% strain of at least any of the following: 0.5, 0.8, 1.0, 1.5, 2.0, 2.5, and 3.0 psi, for example at from 10 to 50% compression. As used herein, the compressive strength is measured according to ASTM 1621-00, as modified by reference to 50% strain.

The foam may have a configuration, for example, of any of a sheet, plank, slab, block, board, and molded shape. The foam may be used for any one or more of void fill, blocking or bracing, thermal insulation, cushioning, sound insulation or vibration dampening.

In preferred embodiments, the mixtures used to make the foam are free of isocyanate reactants, such as those used in formulating polyurethane foams, so that the final foam of the present disclosure is free from isocyanates or isocyanate residues.

The following examples are presented for the purpose of further illustrating and explaining the present invention and are not to be taken as limiting in any regard. Unless otherwise indicated, all parts and percentages are by weight.

In the samples below, the following abbreviations are used:

"PCP1" is a polymerizable condensation polymer made according to the '369 Seppala publication incorporated above and believed to have from 63 to 73 mol % lactic acid units (hydroxy acid units), from 12 to 16 mol % itaconic acid units (unsaturated di-functional units), from 2 to 4 mol % ε-caprolactone units (hydroxy acid units), and from 5 to 7 mol % glycerol (branching units), the polymer having chain ends functionalized with from 6 to 10 mol % glycidyl methacrylate (functional end cap units).

"AESO-2" is an acrylated epoxidized soybean oil available from Cytec Industries Inc. (Smyrna, Ga.) under the Ebecryl 860 trade name and believed to have an acrylate functionality of 3.5 and a glass transition temperature (by DSC) of 13° C.

"Diacrylate-1" is a polyethylene glycol (200) diacrylate available from Sartomer (Exton, Pa.) under the SR-259 trade name.

"Diacrylate-2" is a polyethylene glycol (400) diacrylate available from Sartomer (Exton, Pa.) under the SR-344 trade name.

"Diacrylate-6" is a polyester diacrylate available from Sartomer (Exton, Pa.) under the CN-2254 trade name and a glass transition temperature (by DSC) of 40° C.

"Diacrylate-7" is a diacrylate ester derived from vegetable oil available from Sartomer (Exton, Pa.) under the CD595 trade name and believed to have a glass transition temperature (by DSC) of 91° C. and to be a higher molecular weight analogue of 1,6-hexanediol diacrylate.

Diacrylate-8 is dipropylene glycol diacrylate.

Diacrylate-9 is tripropylene glycol diacrylate available from Sartomer (Exton, Pa.) under the SR 3061 trade name.

"Acrylate-1" is iso-bornyl acrylate (monofunctional acrylate) available from Sartomer (Exton, Pa.) under the SR-506A trade name.

"Tetra-acrylate-1" is a biobased polyester tetra-acrylate available from Cytec Industries Inc. (Smyrna, Ga.) under the Ebecryl Bioligomer 5820 trade name and believed to have an acrylate functionality of 4.

"Peroxide-1" is a diacyl peroxide, more specifically dilauroyl peroxide available from Arkema (King of Prussia, Pa.) under the PD-1104 trade name.

Peroxide-2 is dibenzoyl peroxide available from Arkema (King of Prussia, Pa.) under the Luperox A75 trade name.

Peroxide-3 is 2-butanone peroxide available from Arkema (King of Prussia, Pa.) under the Luperox DDM-9 trade name.

Peroxide-4 is 2,4pentanedione peroxide available from Arkema (King of Prussia, Pa.) under the Luperox 224 trade name.

Peroxide-5 is dibenzoyl peroxide available from AkzoNobel (Amersfoort, The Netherlands) under the Perkadox L-40 RPS trade name.

Peroxide-6 is tert-amylperoxy-2-ethylhexyl carbonate available from AkzoNobel (Amersfoort, The Netherlands) under the Trigonox 131 trade name.

Promoter-1 is N-(2-hydroxyethyl)-N-methyl-para-toluidine available from Albemarle Corporation (Baton Rouge, La.) under the Firstcure MHPT trade name.

"Surfactant-1" is a silicone (polysiloxane) surfactant available from Evonik under the Tegostab B8863P trade name.

Examples

The following foams were made using the following general procedure. As indicated in Table 1, the reactants, initiator, surfactant, and other listed components (if any) were charged to a glass liner of a 300 cc Parr reactor equipped with a CO2 gas inlet, overhead mechanical stirrer, and a dip tube for discharging the mixture through a ⅜ inch ball valve. For the Table 1 samples, the initiator was Peroxide-1 (dilauroyl peroxide) in an amount of 1 wt. %; and the surfactant was Surfactant-1 in an amount of 0.2 wt. %, both amounts based on the total weight of reactants, initiator, surfactant, and other listed components (if any). The Peroxide-1 was typically dissolved in one of the acrylate components before mixing with the other components. To de-oxygenate the vessel, the assembled reactor was first flushed with CO2 for several minutes at atmospheric pressure. The CO2 gas pressure was increased to 400 psig for several minutes followed by venting to the atmosphere. This was repeated two more times. The CO2 gas pressure in the vessel was then increased to 500 psig and the mixture was stirred for 30 minutes. The resulting mixture was discharged without stirring through the ball valve into a plastic beaker at atmospheric pressure to form a froth and was cured by heating the froth in a microwave oven (typically 45-60 seconds to initiate the cure) to form a foam. The resulting foam was cut with an electric knife into cylinders, which were measured and weighed to calculate the density.

TABLE 1

| Sample No. | Reactants/Components wt. %* | Density (pcf) | Comments |
|---|---|---|---|
| 1 | AESO-2 - 62.2%<br>Diacrylate-2 - 11.6%<br>Acrylate-1 - 11.6%<br>PCP1 - 13.3% | 1.8 | finer cells, firmer, cured-well; the PCP1 component was dissolved in acetone to lower the PCP1 viscosity. |
| 2 | AESO-2 - 63.0%<br>Diacrylate-2 - 12.1%<br>Acrylate-1 - 11.0%<br>PCP1 - 12.7% | 2.2 | coarser cells, firm, cured well, the PCP1 component was dissolved in the Diacrylate-2 to lower the PCP1 viscosity. |
| 3 | AESO-2 - 34%<br>Diacrylate-2 - 10%<br>Acrylate-1 - 25%<br>PCP1 - 29.8% | 2.6 | Fine cells |
| 4 | Diacrylate-2 - 25%<br>Acrylate-1 - 25%<br>PCP1 - 48.8% | 6.1 | Froth collapsed during cure |
| 5 | Diacrylate-2 - 10%<br>Acrylate-1 - 25%<br>Tetraacrylate-1 - 34%<br>PCP1 - 29.8% | 2.9 | Froth collapsed during cure then re-expanded, fine cells |

TABLE 1-continued

| Sample No. | Reactants/Components wt. %* | Density (pcf) | Comments |
|---|---|---|---|
| 6 | Diacrylate-9 - 30%<br>PCP1 - 68.8% | 6.6 | Froth collapsed during cure |
| 7 | Diacrylate-9 - 20%<br>Acrylate-1 - 10%<br>PCP1 - 68.8% | 5.7 | Froth collapsed during cure |

*wt. % based on the total weight of reactants, initiator (i.e., the 1% Peroxide-1), surfactant (i.e., the 0.2% Surfactant-1), water, acetone and other components noted. The balance of materials to achieve 100% is peroxide and surfactant.

A series of non-foamed samples of reaction products described in Tables 2 and 3 were made and formed into 20 mil thick cure plaques. These were prepared by placing each degassed reaction product in a template mold in a heated Carver press until cured (typically about 200° F. for 20 minutes). The plaque was subjected to dynamic mechanical analysis (DMA). The storage modulus (representing energy transmitted through the material) and the loss modulus (representing the energy dissipated by the material) were measured and recorded in Table 2. The protective cushioning performance is typically better for a material (once made into a foam) having a higher loss modulus over the temperature range of interest, compared to a material having a lower loss modulus.

The Loss Area was calculated as the area under the loss modulus curve from −10° C. to 40° C. (This is a representative temperature range for expected use of foam protective-packaging material.) The Loss Area is expected to correlate well with energy absorption.

TABLE 2

| | Formulations without PCP1 | | | | | |
|---|---|---|---|---|---|---|
| Sample | Reactants/Components wt. %* | Peak tan δ (° C.) | tan δ | Peak loss modulus (MPa) | Loss Area (GPa · K) | Young's Modulus** (MPa) |
| 8-2 | AESO-1- 57%<br>Diacrylate-2 - 11%<br>Acrylate-1 - 11%<br>Diacrylate-6 - 20% | 32.8 | 0.50 | 136 | 5.03 | 234 |
| 8-3 | AESO-1 - 67%<br>Diacrylate-2 - 16%<br>Acrylate-1 - 16% | 34.4 | 0.43 | 115 | 4.72 | 271 |
| 8-5 | AESO-1- 67%<br>Diacrylate-1- 11%<br>Acrylate-1 - 11%<br>Diacrylate-6 - 10% | 43.8 | 0.42 | 110 | 4.95 | 468 |
| 45-2 | AESO-1- 72.12%<br>Acrylate-1 - 28.88% | 54.3 | 0.46 | 97.9 | 4.73 | 677 |
| 45-3 | AESO-1- 67%<br>Acrylate-1 - 25%<br>Diacrylate-7 - 7% | 59.7 | 0.45 | 87.2 | 4.17 | 773 |
| 45-5 | AESO-1- 67%<br>Acrylate-1 - 12%<br>Diacryiate-7 - 20% | 50.0 | 0.31 | 85.8 | 3.88 | 440 |

*The balance to sum to 100% is 1% Peroxide-6.

**Young's modulus was calculated from the DMA data at about 25° C. as the square root of the sum of the squares of the storage and loss moduli.

TABLE 3

Formulations with PCP1

| Sample | Reactants/Components wt. %* | Peak tan δ (° C.) | tan δ | Peak loss modulus (MPa) | Loss Area (GPa · K) | Young's Modulus** (MPa) |
|---|---|---|---|---|---|---|
| 52-1 | AESO-1- 50.8%<br>Diacrylate-2 - 10%<br>Acrylate-1 - 24.9%<br>PCP1 - 13.3% | 49.9 | 0.54 | 121 | 5.08 | 774 |
| 52-2 | AESO-1- 34.4%<br>Diacrylate-2 - 10.04%<br>Acrylate-1 - 25.02%<br>PCP1 - 29.54% | 53.1 | 0.62 | 138 | 5.25 | 955 |
| 52-3 | Diacrylate-2 - 24.84%<br>Acrylate-1 - 25.09%<br>PCP1 - 48.93% | 46.9 | 0.73 | 177 | 6.37 | 860 |
| 52-4 | Diacrylate-2 - 10.04%<br>Acrylate-1 - 25.02%<br>Tetra-acrylate-1 - 34.4%<br>PCP1 - 29.54% | 52.9 | 0.57 | 143 | 6.21 | 777 |
| 92A | PCP1 99% | 40.4 | 1.08 | 231 | 7.43 | 213 |
| 92B | PCP1 - 69%<br>Diacrylate-9 30% | 45.5 | 0.43 | 190 | 8.07 | 496 |
| 92C | PCP1 - 69%<br>Diacrylate-9 - 20%<br>Acrylate-1 - 10% | 49.2 | 0.51 | 210 | 9.33 | 541 |

*The balance to sum to 100% is 1% Peroxide-6.
**Young's modulus was calculated from the DMA data at about 25° C. as the square root of the sum of the squares of the storage and loss moduli.

The Table 3 samples 52-1 through 52-4 comprising PCP1 were surprisingly and unexpectedly found to have significantly higher Loss Areas while maintaining a high Young's modulus relative to the samples of Table 2, which did not comprise PCP1. This indicates that foam formulations incorporating PCP1 into the foamed reaction product (for example combined with AESO) would be expected to produce superior cushioning performance relative foam without the PCP1 material.

Examples of Two-Part Formulations

To prepare two-part formulations, a mixing/dispenser was assembled using two 300 cc Parr reactors. The reactors were equipped with a $CO_2$ gas inlet, pressure gauge, overhead mechanical stirrer, and a dip tube exit connected to a mixing head available for manufacture of Instapak (Sealed Air Corporation) polyurethane foam. The two Parr reactors were connected to a common $CO_2$ manifold. The pneumatically operated Instapak head had a foam dispensing cartridge with a ³⁄₁₆" mixing chamber and 0.0259" chemical ports. When actuated, the valving rod retracted to allow parts A and B to flow into the mixing chamber and exit as a froth. The following were charged to the reactors:

Part A:
59.93% PCP1,
20% Diacrylate-9,
10% acrylate-1,
7% acetone,
2% peroxide-2,
0.67% peroxide-6 and
0.4% surfactant-1.
Peroxide-2 was dissolved/dispersed in the acetone and acrylates prior to mixing with the remaining ingredients.
Part B:
61.57% PCP1,
20% Diacrylate-9,
10% acrylate-1,
7% acetone,
1% Promoter-1,
0.4% surfactant-1, and
0.03% blue dye.

To de-oxygenate the vessels, the assembled reactors were first flushed with $CO_2$ for several minutes at atmospheric pressure. The $CO_2$ gas pressure was increased to 400 psig for several minutes followed by venting to the atmosphere. This was repeated two more times. The $CO_2$ gas pressure in the vessel was then increased to 500 psig and the mixture was stirred for 30 minutes. The resulting mixture was discharged without stirring through the Instapak head into a plastic beaker at atmospheric pressure to form a froth. After approximately 5 minutes, the froth began to exotherm and cured to a foam. The resulting foam had a density was 3.6 pcf.

Any numerical value ranges recited herein include all values from the lower value to the upper value in increments of one unit provided that there is a separation of at least 2 units between any lower value and any higher value. As an example, if it is stated that the amount of a component or a value of a process variable (e.g., temperature, pressure, time) may range from any of 1 to 90, 20 to 80, or 30 to 70, or be any of at least 1, 20, or 30 and/or at most 90, 80, or 70, then it is intended that values such as 15 to 85, 22 to 68, 43 to 51, and 30 to 32, as well as at least 15, at least 22, and at most 32, are expressly enumerated in this specification. For values that are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. The definitions and disclosures set forth in the present Application control over any inconsistent definitions and disclosures that may exist in an incorporated reference. All references to ASTM tests are to the most recent, currently approved, and published version of the ASTM test identified, as of the priority filing date of this application. Each such published ASTM test method is incorporated herein in its entirety by this reference.

What is claimed is:

1. A method of making a foam comprising:
   (1) creating a mixture at a temperature of at most 45° C. comprising:
      (i) a polymerizable condensation polymer comprising:
         hydroxy acid units;
         unsaturated di-functional units selected from one or more of unsaturated dicarboxylic acid units and unsaturated di-alcohol units; and
         optionally, a branching unit selected from (a) a polyfunctional alcohol unit derived from polyfunctional alcohol having three or more hydroxyl groups or epoxide groups and (b) a multifunctional acid unit derived from multifunctional acids having three or more carboxyl groups; and
      (ii) a blowing agent;
   (2) expanding the mixture to create a froth comprising bubbles of the expanded blowing agent suspended in the mixture without a solidified resin matrix surrounding and encasing the bubbles; and
   (3) free radical thermoset reacting the polymerizable condensation polymer in the froth to create a foam comprising a molecular network comprising multiples of the polymerizable condensation polymer forming a solidified resin matrix surrounding and encasing the bubbles within the molecular network and having a density of at most 20.0 pounds per cubic foot.

2. The method of claim 1 wherein the hydroxy acid units are selected from one or more of α-hydroxy acid units, β-hydroxy acid units, aliphatic α-hydroxy acid units, aromatic α-hydroxy acid units, L-lactic acid units, D-lactic acid units, glycolic acid units, 2-hydroxycaproic acid units, 6-hydroxycaproic acid units, L-mandelic acid units, D-mandelic acid units, malic acid units, and citric acid units.

3. The method of claim 1 wherein the unsaturated di-functional units comprise unsaturated dicarboxylic acid units.

4. The method of claim 1 wherein the unsaturated di-functional units comprise unsaturated di-alcohol units.

5. The method of claim 1 wherein the polymerizable condensation polymer comprises a branching unit comprising a polyfunctional alcohol unit derived from a polyfunctional alcohol having three or more hydroxyl groups or epoxide groups.

6. The method of claim 1 wherein the polymerizable condensation polymer comprises a branching unit comprising a polyfunctional alcohol unit selected from one or more of pentaerythritol units, trimethylolpropane units, mannitol units, glycerol units, polyglycerol units, epoxidized triglyceride units, and epoxidized soybean oil units.

7. The method of claim 1 wherein the polymerizable condensation polymer comprises a branching unit comprising a multifunctional acid unit derived from multifunctional acids having three or more carboxyl groups.

8. The method of claim 1 wherein the branching unit comprises a multifunctional acid unit selected from one or more of 1,1,3-propane-tricarboxylic acid units, pyromellitic dianhydride units, benzophenone tetracarboxylic dianhydride units, 1,1,2-ethanecarboxylic acid units, 1,2,3,4-butanetetracarboxylic acid units, and 1,2,3,4-cyclopentane-tetracarboxylic acid units.

9. The method of claim 1 wherein the polymerizable condensation polymer further comprises a saturated di-functional unit selected from one or more of:
   saturated di-carboxylic acid units; and
   saturated di-alcohol units.

10. The method of claim 1 wherein the polymerizable condensation polymer further comprises one or more functional end cap units in an amount of at least 2 mole % and at most 20 mole %.

11. The method of claim 1 wherein the polymerizable condensation polymer comprises:
    at least 35 mole % hydroxy acid units and at most 85 mole % hydroxy acid units;
    at least 6 mole % unsaturated di-functional units and at most 24 mole % unsaturated di-functional units.

12. The method of claim 1 wherein the mixture further comprises a co-reactant having a functionality of two or one, wherein the co-reactant is selected from one or more of styrene, alpha-methyl styrene, vinyl toluene, diallyl phthalate, diallyl isophthalate, diallyl maleate, and acrylate.

13. The method of claim 12 wherein the co-reactant comprises an acrylate, with the acrylate comprising a diacrylate.

14. The method of claim 1 wherein the mixture further comprises high-functionality reactant having a functionality of three or more, wherein the high-functionality reactant is not the polymerizable condensation polymer.

15. The method of claim 1 wherein the blowing agent comprises physical blowing agent, and the expanding step expands the physical blowing agent from a pressure of at least 200 psig.

16. The method of claim 1 wherein the froth is exposed to atmospheric pressure during the reaction step.

17. The method of claim 1 wherein the polymerizable condensation polymer comprises a branching unit in an amount of at least 1 mole % branching units and at most 14 mole % branching units.

18. The method of claim 1 wherein the mixture further comprises an initiator, the method further comprising activating the initiator in the froth.

19. The method of claim 18 wherein the initiator comprises radiation-activated initiator, and the reacting step further comprises exposing the froth to an amount and type of radiation sufficient to activate the radiation-activated initiator.

20. The method of claim 18 wherein the initiator comprises thermally-activated initiator, wherein the reacting step further comprises heating the froth to a temperature sufficient to activate the thermally-activated initiator.

* * * * *